(12) United States Patent
Kim (10) Patent No.: US 7,619,505 B2
(45) Date of Patent: Nov. 17, 2009

(54) VEHICLE DIRECTION GUIDE VIBRATION SYSTEM AND METHOD

(75) Inventor: Byung Sung Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 336 days.

(21) Appl. No.: 11/645,285

(22) Filed: Dec. 22, 2006

(65) Prior Publication Data

US 2008/0100476 A1 May 1, 2008

(30) Foreign Application Priority Data

Oct. 31, 2006 (KR) ...................... 10-2006-0106442

(51) Int. Cl.
*H04B 3/36* (2006.01)
*G08B 13/18* (2006.01)
*B60R 25/10* (2006.01)
*G08B 19/02* (2006.01)
*A47C 7/62* (2006.01)
*E05B 15/00* (2006.01)

(52) U.S. Cl. ................. 340/407.1; 340/556; 340/856.4; 340/429; 340/582; 297/217.3; 70/1

(58) Field of Classification Search ............... 340/407.1
See application file for complete search history.

(56) References Cited

U.S. PATENT DOCUMENTS

| | | | | |
|---|---|---|---|---|
| 4,722,169 | A * | 2/1988 | DeSantis ...................... | 53/494 |
| 6,551,259 | B1 * | 4/2003 | Wu .............................. | 601/99 |
| 2002/0145512 | A1 * | 10/2002 | Sleichter et al. .......... | 340/407.1 |
| 2004/0239086 | A1 * | 12/2004 | Ventura et al. ............... | 280/735 |
| 2005/0027444 | A1 * | 2/2005 | Kim ........................... | 701/208 |
| 2005/0168350 | A1 * | 8/2005 | Tauchi ........................ | 340/903 |
| 2005/0275520 | A1 * | 12/2005 | Hijikata et al. .............. | 340/466 |
| 2006/0044130 | A1 * | 3/2006 | Danowski .................... | 340/475 |
| 2006/0097857 | A1 * | 5/2006 | Osaka et al. ................. | 340/435 |
| 2006/0255920 | A1 * | 11/2006 | Maeda et al. ............. | 340/407.1 |
| 2007/0027583 | A1 * | 2/2007 | Tamir et al. .................... | 701/1 |
| 2008/0055055 | A1 * | 3/2008 | Powell et al. ............ | 340/407.1 |

FOREIGN PATENT DOCUMENTS

| | | |
|---|---|---|
| JP | 11-108672 | 4/1999 |
| JP | 11-316898 | 11/1999 |
| JP | 2000-149191 | 5/2000 |
| JP | 2000-155893 | 6/2000 |
| JP | 2000-221051 | 8/2000 |
| KR | 2003-0018654 A | 3/2003 |
| KR | 2005-0121571 A | 12/2005 |

* cited by examiner

*Primary Examiner*—Daniel Wu
*Assistant Examiner*—Fekadeselassie Girma
(74) *Attorney, Agent, or Firm*—Morgan, Lewis & Bockius LLP

(57) ABSTRACT

The present invention relates to a direction guide vibration system of a vehicle operating with a navigation and control method thereof, which applies vibration to a driver's seat on which a driver sits at the spot where a left turn or a right turn and a U turn are expected, on a path to move to a driver's intended destination, informs a driver thereof in advance for people and the hearing impaired using a navigation and informs the driver thereof before an enforcement area in which an over-speed camera is installed, thereby securing a safe driving of a vehicle.

7 Claims, 9 Drawing Sheets

VEHICLE DIRECTION GUIDE VIBRATION SYSTEM AND METHOD

CROSS-REFERENCE TO RELATED APPLICATIONS

This application claims the benefit of Korean Patent Application No. 2006-0106442, filed on Oct. 31, 2006, in the Korean Intellectual Property Office, the disclosure of which is incorporated herein by reference.

BACKGROUND

1. Field of the Invention

The present invention relates to a direction guide vibration system of a vehicle operating with a navigation and control method thereof, which applies vibration to a driver's seat on which a driver sits at the spot where a left turn or a right turn and a U turn are expected, on a path to move to a driver's intended destination and informs a driver thereof in advance for people and the hearing impaired using a navigation, thereby securing a safe driving of a vehicle.

2. Discussion of Related Art

In general, a navigation system installed in a vehicle searches a path for an intended destination through a LCD display and guides the vehicle's proceeding direction to the driver by displaying the search result on the display. Also, it may include a function to guide a path to move up to the intended destination using voice in order to prevent accidents.

As described above, a navigation system may be used by vehicle drivers to arrive at an intended destination. However, since many people cannot hear a voice guide, they drive a vehicle, staring at a screen so that the concentration of driving is dispersed and the risk of accident occurrence is increased.

SUMMARY OF THE INVENTION

The present invention relates to a direction guide vibration system for a vehicle operating with a navigation system. In the illustrative embodiment, the vehicle direction guide applies vibration to a driver's seat on which a driver sits before an intended spot, where a vehicle should make a right turn or a left turn, and an U turn, on the intended path that a vehicle moves and inform hearing impaired the driver using a navigation system thereof.

In the an illustrative embodiment, a direction guide vibration system of a vehicle operating with a navigation system, may comprise a driving unit installed along a longitudinal direction of a seat rail provided in the vehicle. The direction guide system may further include a chain circulated and operated by a roller connected onto an axis of a driving motor; a vibration generator provided in the upper side of the chain to generate vibration in a driver's seat on which the driver sits at the time of a left turn, a right turn or an U-turn of the vehicle, together with an image and a voice guide provided through the navigation system. Additionally, a controller electrically connected to the driving unit and the vibration generator and controlling to operate the driving unit at the time of the left turn, the right turn and the U-turn of the vehicle may be provided to move a position of the vibration generator and in the state that the vibration generator is moved, generate the vibration in the vibration generator.

The driving motor of the driving unit may be constituted to use a stepping motor.

The driving units may be constituted to be provided in both left and right sides of the lower of a seat base of the driver's seat, respectively.

The vibration generator may comprise a vibration plate provided in the upper side of the chain and a vibration motor installed in the lower side of the vibration plate and rotating a rotation cam installed in an end of the axis of the motor to operate the vibration plate in up and down directions.

The seat rail may be constituted to be installed with stoppers for limiting an excess movement of the vibration plate.

The rotation cam of the vibration generator may be constituted to be formed with a cam body in a triangular shape wherein the cam body surface-contacted with an outer surface of the vibration plate is formed by projecting to be rounded outwardly.

The driving unit may comprise position sensing sensors that are installed on the seat rail and sense the upper limit and the lower limit position of the vibration generator.

The seat rail may be constituted to be installed with the stopper for limiting an excess movement of the vibration plate.

In another embodiment, there may be provided a control method of the direction guide vibration system of a vehicle operating with the navigation system. The control method may comprise a left/right turn mode step for informing the driver that the driver has to make a left turn or a right turn of the vehicle by applying vibration to a driver's seat on which the driver sits, before an expected position in which the driver has to make a left turn or a right turn of the vehicle on an moving path along which the vehicle will be moved to an intended destination. The vibration may be provided together with a image guide or a voice guide provided through the navigation system. The control method may further comprise an U-turn mode step for informing the driver that the vehicle arrives at an U-turn expecting region by applying the vibration to the driver's seat on which the driver is seated when arriving at the U-turn expecting region after making the left turn or the right turn of the vehicle. The control method may further comprise an overspeed camera mode step for being input with information from a plurality of overspeed cameras installed on the moving path along which the vehicle will be moved to the destination through the navigation system and informing the driver of an enforcement area by applying the vibration to the driver's seat on which the driver is seat before the enforcement area of the overspeed camera.

Moreover, the left/right turn mode steps may include a remote distance mode step for generating the vibration plural times in the driver's seat in order to inform the driver of a position of a traffic signal lamp in the position in which the vehicle is distanced above 100 meter from the traffic signal lamp, a mid distance mode step for generating the vibration plural times in the driver's seat when the vehicle is positioned within 100 meter from the traffic signal lamp, and a approaching distance mode step for informing the driver that the vehicle approaches the traffic signal lamp by applying the vibration to the driver's seat, in the case that the vehicle approaches the traffic signal lamp.

Additionally, the left/right turn mode steps may generate the vibration in the left side of the seat base of the driver's seat at the time of the left turn of the vehicle and to generate the vibration in the right side of the seat base of the driver's seat at the time of the right turn of the vehicle.

Also, the U-turn mode step may include a left side U-turn mode step for informing the driver that the driver makes the U-turn of the vehicle to the left side by generating the vibration in the left side of the driver' seat, and a right side U-turn mode step for informing the driver that the driver makes the U-turn of the vehicle to the right side by generating the vibration in the right side of the driver' seat after informing the driver by simultaneously generating the vibration in both left and right sides of the driver's seat on which the driver sits before the time to make an U-turn of the vehicle.

The overspeed camera mode step may include a camera sensing mode step operated in the position in which the vehicle is distanced above 100 meter from the position in which the overspeed camera is installed, a preliminary warning mode step operated when the vehicle is positioned within 100 meter from the overspeed camera, and an approaching warning mode step for informing the driver that the vehicle approaches the overspeed camera by applying the vibration to the driver's seat, in the case that the vehicle approaches the overspeed camera.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF PREFERRED EMBODIMENTS

Embodiments of the direction guide vibration system of the vehicle operating with the navigation according to the present invention as described above and the control method are described with reference to drawings.

Referring to FIG. 1 to FIG. 9, a direction guide vibration system of a vehicle operating with a navigation according to the present invention is comprises a driving unit 100 installed along a longitudinal direction of a seat rail 10 provided in the vehicle and comprising a chain 130 circulated and operated by a roller 120 connected onto an axis of a driving motor 110; a vibration generator 200 provided in the upper side of the chain 130 to generate vibration in a driver's seat 20 on which the driver sits at the time of a left turn, a right turn and an U-turn of the vehicle, together with image and voice guide through the navigation 2; and a controller 300 electrically connected to the driving unit 100 and the vibration generator 200 and controlling to operate the driving unit at the time of the left turn, the right turn and the U-turn of the vehicle to move a position of the vibration generator 200 and in the state that the vibration generator 200 is moved, generate the vibration in the vibration generator 200.

Figure 2:
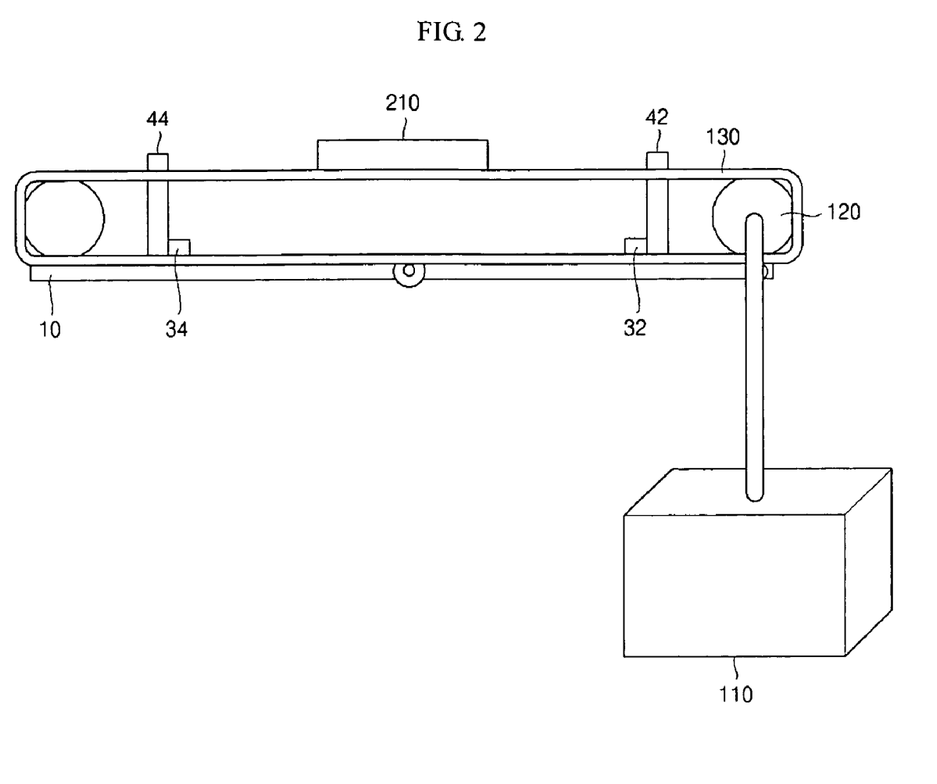
FIG. 2 is a view showing a driving unit and a vibration generator of the direction guide vibration system of the vehicle operating with the navigation according to the present invention.

The driving motor 110 of the driving unit 100 is constituted to use a stepping motor. Since the chain is not operated only in one direction but it must be operated to be capable of moving forward and back, it is preferable to use the stepping motor as driving motor.

The driving unit 100 is constituted to be provided in both left and right sides of the lower of a seat base 22 of the driver's seat 20, respectively.

The vibration generator 200 comprises a vibration plate 210 provided in the upper side of the chain 130 and a vibration motor 230 installed in the lower side of the vibration plate 210 and rotating and operating a rotation cam 220 installed in an end of the axis of the motor to operate the vibration plate 210 in up and down directions.

The seat rail 10 is constituted to be installed with stoppers 42, 44 for limiting an excess movement of the vibration plate 210.

The rotation cam 220 of the vibration generator 200 is constituted to be formed with a cam body in a shape of a triangle wherein the cam body 222 surface-contacted with an outer surface of the vibration plate 210 is formed by projecting to be rounded outwardly.

The driving unit 100 comprises position sensing sensors 30a, 30b that are installed on the seat rail 10 and sense the upper limit and the lower limit position of the vibration generator 200.

The seat rail 10 is constituted to be installed with the stoppers 42, 44 for limiting an excess movement of the vibration plate.

Figure 3:
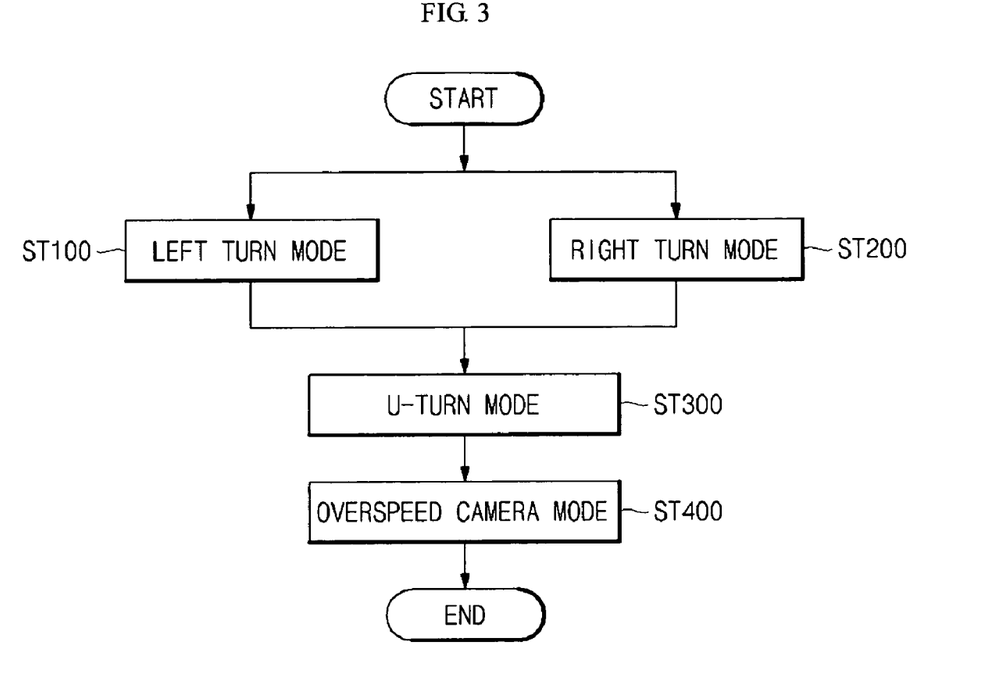
FIG. 3 is a flow chart showing a control method of the direction guide vibration system of the vehicle operating with the navigation according to the present invention.
Figure 4:
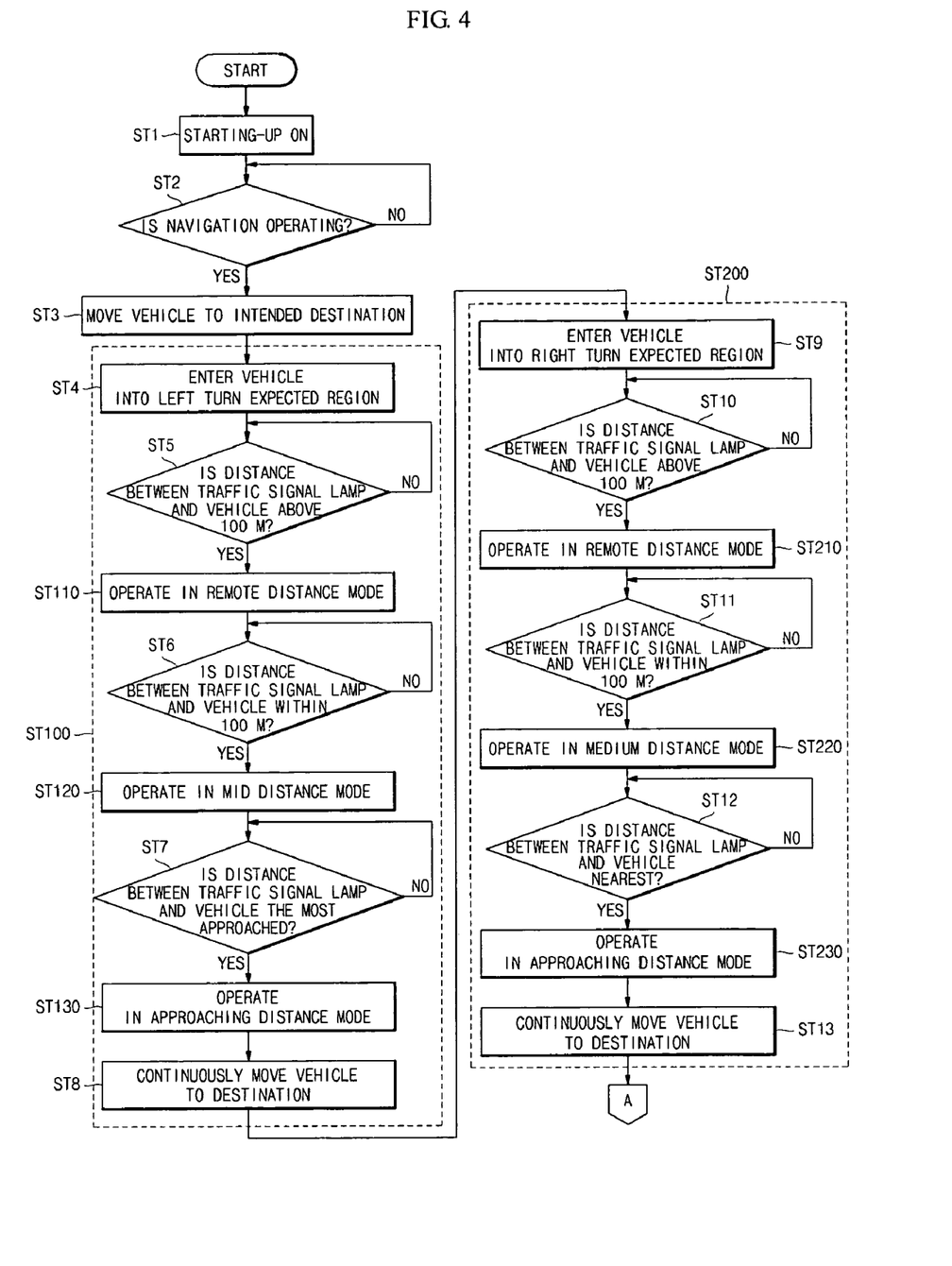
FIG. 4 and FIG. 5 is a view showing an embodiment according to the control method of the direction guide vibration system of the vehicle operating with the navigation according to the present invention.
Figure 5:
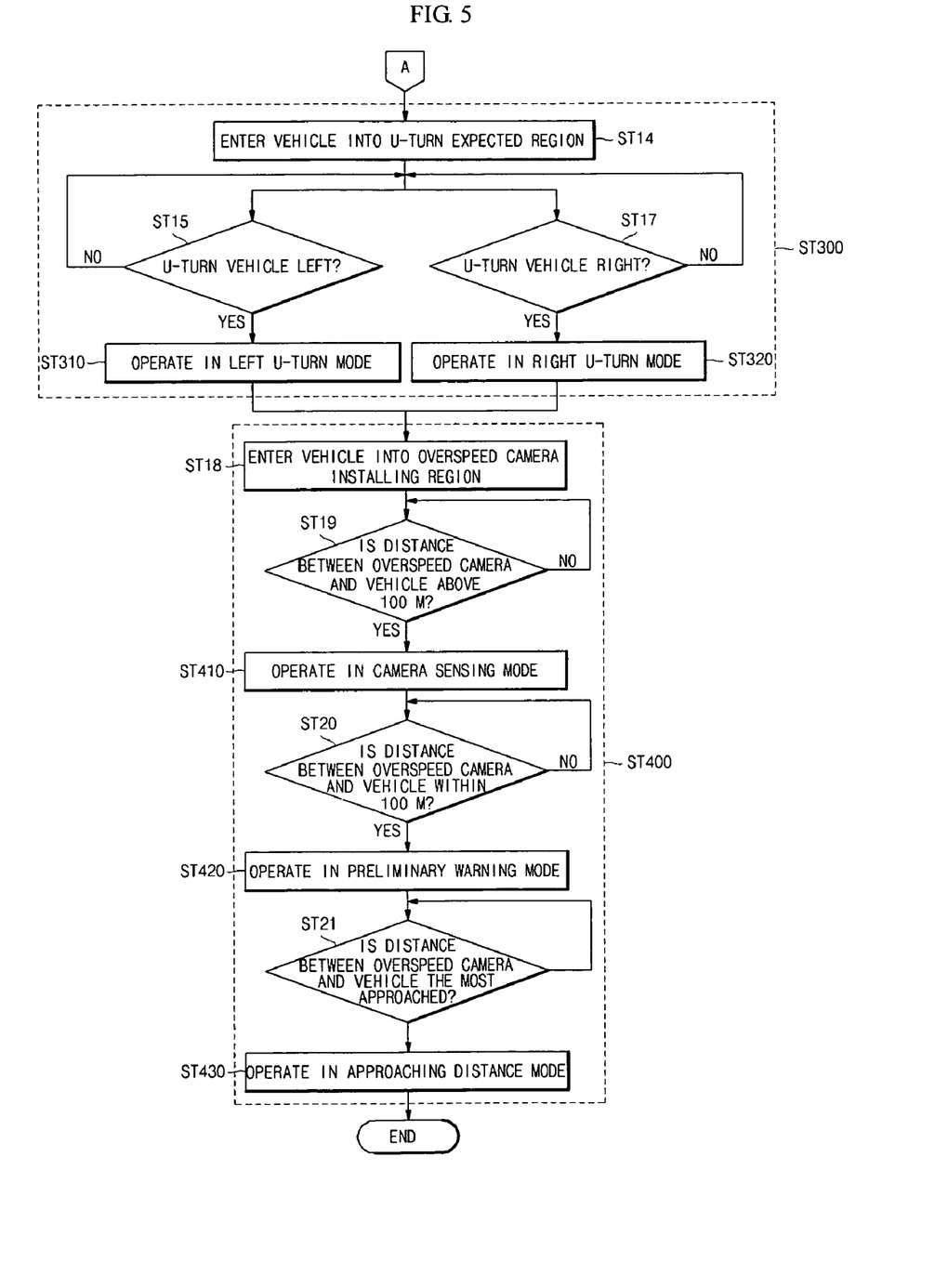

A control method of the direction guide vibration system of the vehicle operating with the navigation according to the present invention constituted as described above includes a left/right turn mode step ST100, ST 200 for informing the driver that the driver has to make a left turn or a right turn of the vehicle by applying vibration to a driver's seat on which the driver sits, before an expected position in which the driver has to make a left turn or a right turn of the vehicle on an moving path along which the vehicle will be moved to an intended destination, together with image and voice guide through the navigation, while driving the vehicle in the state that the driver's seats the driver's seat; an U-turn mode step ST300 for informing the driver that the vehicle arrives at an U-turn expecting region by applying the vibration to the driver's seat on which the driver is seat when arriving at the U-turn expecting region after making the left turn or the right turn of the vehicle; and an overspeed camera mode step ST400 for being input with information for a plurality of overspeed cameras installed on the moving path along which the vehicle will be moved to the destination through the navigation and informing the driver of an enforcement area by applying the vibration to the driver's seat on which the driver is seat before the enforcement area of the overspeed camera.

The left/right turn mode steps ST100, ST200 include a remote distance mode step ST110, ST210 for generating the vibration plural times in the driver's seat in order to inform the driver of a position of a traffic signal lamp in the position in which the vehicle is distanced above 100 meter from the traffic signal lamp, a mid distance mode step ST300 for generating the vibration plural times in the driver's seat when the vehicle is positioned within 100 meter from the traffic signal lamp, and a approaching distance mode step ST300 for informing the driver that the vehicle approaches the traffic signal lamp by applying the vibration to the driver's seat, in the case that the vehicle approaches the traffic signal lamp.

For example, the the approaching mode distance step may be activated when the vehicle is position less than 50 meters from the traffic signal lamp.

The left/right turn mode steps ST100, ST200 generate the vibration in the left side of the seat base of the driver's seat at the time of the left turn of the vehicle and to generate the vibration in the right side of the seat base of the driver's seat at the time of the right turn of the vehicle.

The U-turn mode step ST300 includes a left side U-turn mode step S310 for informing the driver that the driver makes the U-turn of the vehicle to the left side by generating the vibration in the left side of the driver' seat, and a right side U-turn mode step ST320 for informing the driver that the driver makes the U-turn of the vehicle to the right side by generating the vibration in the right side of the driver' seat after informing the driver by simultaneously generating the vibration in both left and right sides of the driver's seat on which the driver sits before the time to make an U-turn of the vehicle.

The overspeed camera mode step ST400 includes a camera sensing mode step ST410 operated in the position in which the vehicle is distanced above 100 meter from the position in which the overspeed camera is installed, a preliminary warning mode step ST420 operated when the vehicle is positioned within 100 meter from the overspeed camera, and an approaching warning mode step ST430 for informing the driver that the vehicle approaches the overspeed camera by applying the vibration to the driver's seat, in the case that the vehicle approaches the overspeed camera.

For example, the approaching warning mode step ST430 may be activated when the vehicle is position less than 50 meters from the overspeed camera.

Operating states of the direction guide vibration system of the vehicle operating with the navigation according to the present invention as described above and the control method are described with reference to drawings.

Referring to FIG. 1 to FIG. 6, when start-up is turned on ST1 in the state that the driver gets on a vehicle, a desired destination is input ST2 using a navigation 2 while the vehicle is started-up. In the case that a driver getting on the vehicle hearing impaired is hearing impaired, the direction guide vibration system of the vehicle operating with the navigation according to the present invention is operated as follow, because he may not hear a sound of voice guide realized through the navigation system.

If the vehicle enters a left turn expected region ST4 while being driven toward an intended destination input by the driver ST3, the vehicle is driven in a left turn mode ST100.

That is, if the vehicle is moved from a position in which the vehicle is distanced above 100 meter from a traffic signal lamp ST5 before the expected position in which the vehicle has to make a left turn toward a traffic signal lamp, the vehicle is driven in a remote distance mode ST110 to inform the driver of it.

The remote distance mode ST110 is described with reference to FIG. 1 to FIG. 6.

Figure 1:
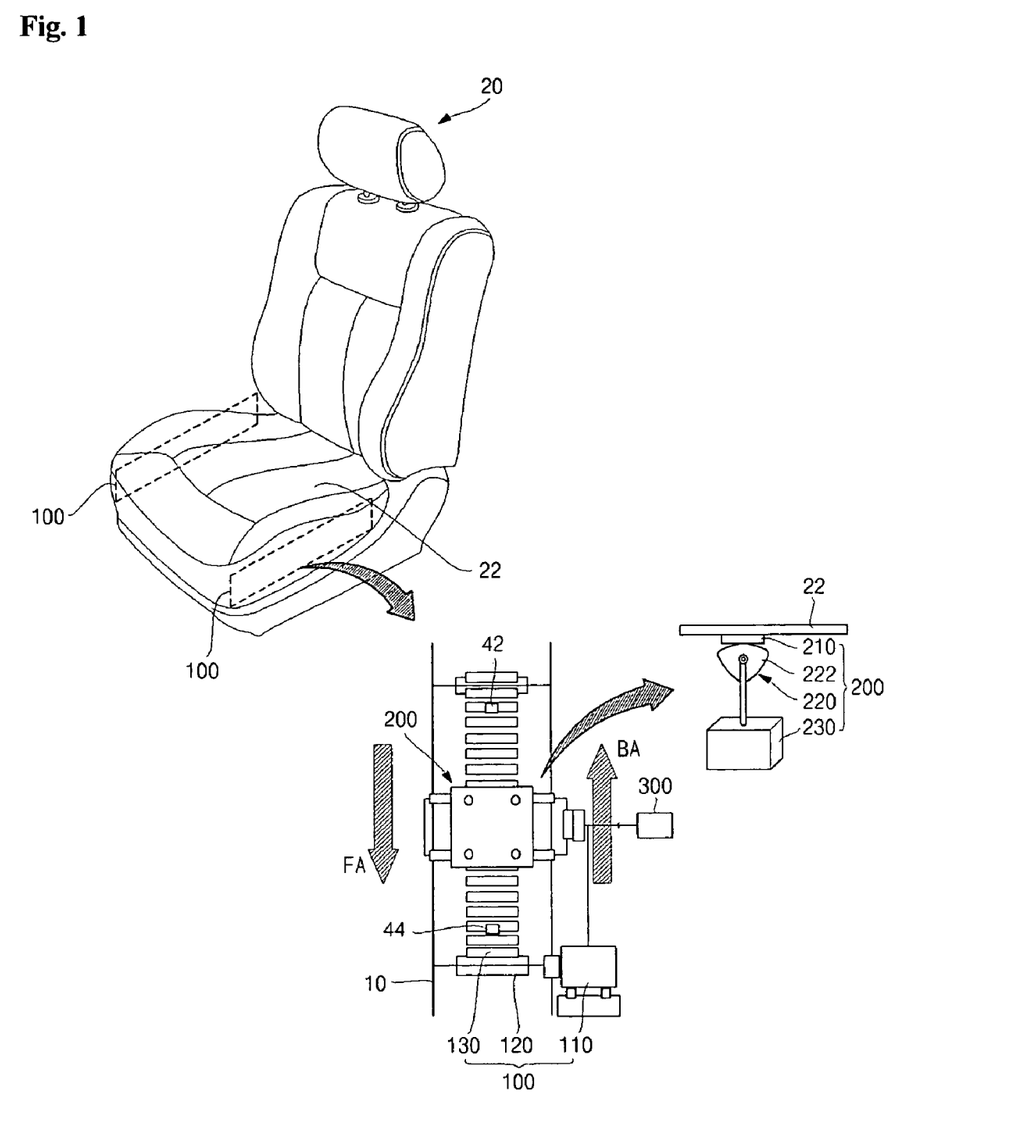
FIG. 1 is a view showing a configuration of a direction guide vibration system of a vehicle operating with a navigation according to the present invention.
Figure 6:
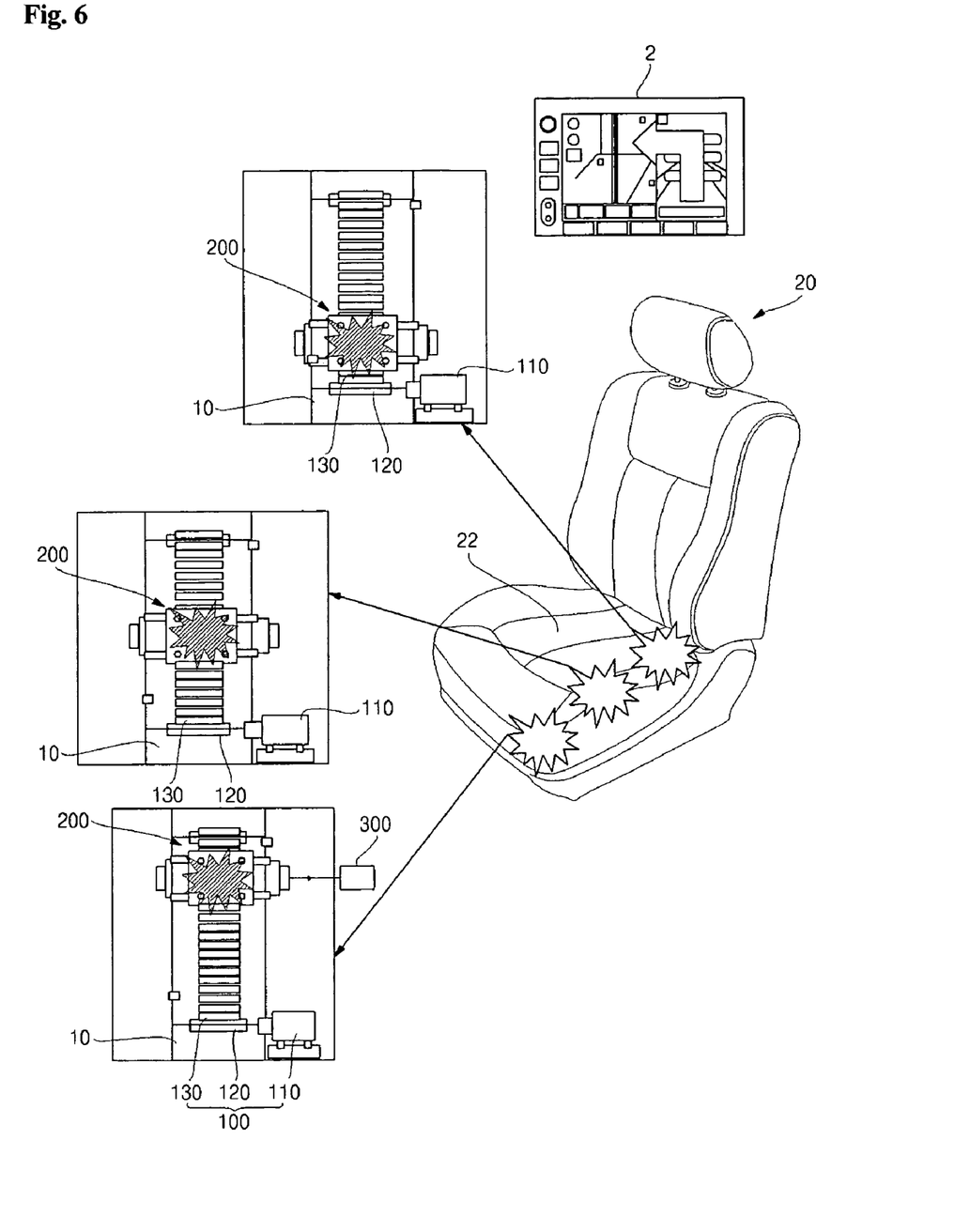
FIG. 6 and FIG. 7 is a view showing an operating state at the time of left turn or right turn of the vehicle according to the control method of the direction guide vibration system of the vehicle operating with the navigation according to the present invention.

In the remote distance mode ST110, power is applied to the driving motor 110 installed in the driving unit 100 by controller 300 to rotate the chain 130 coupled with the roller 120 in one direction, but preferably, the chain 130 is moved toward the front of the seat base 22 in order to inform the driver of a state that the traffic signal lamp is distanced and positioned above 100 meter in the front of the vehicle, so that the vibration generator 200 is forwardly moved toward the leading end of the seat base 22. A position of the vibration generator 200 is sensed by a position sensing sensor 32 so that an accurate position of the vibration generator 200 is transferred to the controller 300, and if the vibration generator 200 is positioned in the position memorized on a memory (not shown) of the controller 300, an operation of the driving motor 110 is stopped.

The controller 300 applies the power to the vibration motor 230 in a state that the vibration generator 200 is positioned in the leading end of the seat base 22, thereby rotating the rotation cam 220. As shown in the drawings, since the cam body 222 protrudes to be rounded in a shape of a triangle, the rotation cam 220 allows the vibration plate 210 to vibrate the left side of the seat base 22.

If the vibration is generated as described above, the driver hearing impairedseated in the seat 20 senses the vibration in the leading end of the lower side of a thigh so that he knows that he makes a left turn of the vehicle in the position distanced above 100 meter to a forward area.

If the vehicle is positioned within 100 meter from the traffic signal lamp in the left turn expected position ST6 while being continuously driven toward the intended destination, it is driven in a mid distance mode ST120.

The mid distance mode ST120 is described with reference to FIG. 1 to FIG. 6.

In the mid distance mode ST120, power is applied to the driving motor 110 installed in the driving unit 100 by controller 300 to rotate the chain 130 coupled with the roller 120 in one direction, but preferably, the chain 130 moved to the front of the seat base 22 in order to inform the driver of a state that the traffic signal lamp is distanced and positioned within 100 meter in the front of the vehicle is moved to an initial center position so that the vibration generator 200 is positioned in a center left of the seat base 22.

The controller 300 applies the power to the vibration motor 230 in a state that the vibration generator 200 is positioned in the center left of the seat base 22, thereby rotating the rotation cam 220. As shown in the drawings, since the cam body 222 protrudes to be rounded in the shape of the triangle, the rotation cam 220 allows the vibration plate 210 to vibrate the center left of the seat base 22.

If the vibration is generated as described above, the driver hearing impaired seated in the seat 20 senses the vibration in the center of the lower side of the thigh so that he knows that he makes a left turn of the vehicle in the position distanced within 100 meter to a forward area.

If the vehicle most approaches to the traffic signal lamp in the left turn expected position ST7 while being continuously driven toward the intended destination, it is driven in a approaching distance mode ST130.

In the approaching distance mode ST130, power is applied to the driving motor 110 installed in the driving unit 100 by controller 300 to rotate the chain 130 coupled with the roller 120 in one direction, but preferably, the chain 130 is rotated and operated by operating the driving motor 110 in order that the vibration generator 200 is moved to the back of the seat base 22 in order to inform the driver of a state that the traffic signal lamp approaches the front of the vehicle.

The controller 300 is input with a state that the vibration generator 20 is positioned in a left back of the seat base 22 through a position sensing sensor 34 to stop an operation of the driving motor 100. The power is applied to the vibration motor 230 in a state that the vibration generator 200 is positioned as described above, thereby rotating the rotation cam 220. As shown in the drawings, since the cam body 222 protrudes to be rounded in the shape of the triangle, the rotation cam 220 allows the vibration plate 210 to vibrate the left back of the seat base 22.

If the vibration is generated as described above, the driver who is hearing impairedseated in the seat 20 senses the vibration in the back of the lower side of the thigh so that he knows that he immediately makes a left turn of the vehicle. Accordingly, he drives the handle of the vehicle to the left to make a left turn of the vehicle.

If the vehicle enters the right turn expected position ST9 while being continuously driven toward the intended destination ST8, it is operated as follow.

Referring to FIG. 1 to FIG. 7, if the vehicle is moved from a position in which the vehicle is distanced above 100 meter from a traffic signal lamp ST10 before the expected position in which the vehicle has to make a right turn toward the traffic signal lamp, the vehicle is driven in a remote distance mode ST210 to inform the driver of it.

The remote distance mode ST210 is described with reference to FIG. 1 to FIG. 7.

Figure 7:
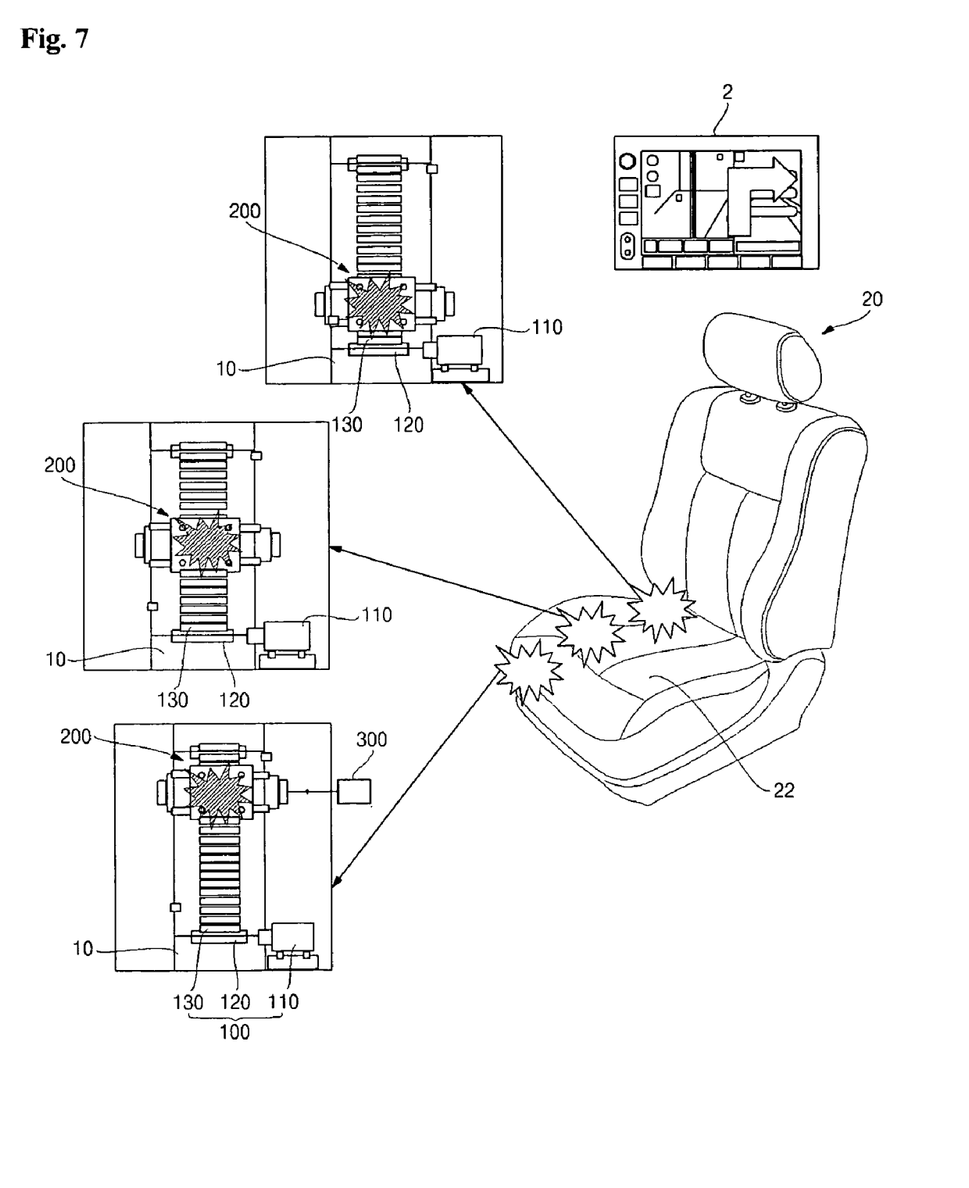

In the remote distance mode ST210, power is applied to the driving motor 110 installed in the driving unit 100 by controller 300 to rotate the chain 130 coupled with the roller 120 in one direction, but preferably, the chain 130 is moved toward the front of the seat base 22 in order to inform the driver of a state that the traffic signal lamp is distanced and positioned above 100 meter in the front of the vehicle, so that the vibration generator 200 is forwardly moved toward the leading end of the seat base 22. A position of the vibration generator 200 is sensed by a position sensing sensor 32 so that an accurate position of the vibration generator 200 is transferred to the controller 300, and if the vibration generator 200 is positioned in the position memorized on a memory (not shown) of the controller 300, an operation of the driving motor 110 is stopped.

The controller 300 applies the power to the vibration motor 230 in a state that the vibration generator 200 is positioned in the leading end of the seat base 22, thereby rotating the rotation cam 220. As shown in the drawings, since the cam body 222 protrudes to be rounded in the shape of the triangle, the rotation cam 220 allows the vibration plate 210 to vibrate the right side of the seat base 22.

If the vibration is generated as described above, the driver who is hearing impairedseated in the seat 20 senses the vibration in the leading end of the lower side of the thigh so that he knows that he makes a right turn of the vehicle in the position distanced above 100 meter to a forward area.

If the vehicle is positioned within 100 meter from the traffic signal lamp in the right turn expected position ST11 while being continuously driven toward the intended destination, it is driven in a mid distance mode ST220.

The mid distance mode ST220 is described with reference to FIG. 1 to FIG. 7.

In the mid distance mode ST220, power is applied to the driving motor 110 installed in the driving unit 100 by controller 300 to rotate the chain 130 coupled with the roller 120 in one direction, but preferably, the chain 130 moved to the front of the seat base 22 in order to inform the driver of a state that the traffic signal lamp is distanced and positioned within 100 meter in the front of the vehicle is moved to an initial center position so that the vibration generator 200 is positioned in a center right of the seat base 22.

The controller 300 applies the power to the vibration motor 230 in a state that the vibration generator 200 is positioned in the center right of the seat base 22, thereby rotating the rotation cam 220. As shown in the drawings, since the cam body 222 protrudes to be rounded in the shape of the triangle, the rotation cam 220 allows the vibration plate 210 to vibrate the center right of the seat base 22.

If the vibration is generated as described above, the driver who is hearing impairedseated in the seat 20 senses the vibration in the center of the lower side of the thigh so that he knows that he makes a right turn of the vehicle in the position distanced within 100 meter to a forward area.

If the vehicle most approaches the traffic signal lamp in the right turn expected position ST12 while being continuously driven toward the intended destination, it is driven in a approaching distance mode ST230.

In the approaching distance mode ST230, power is applied to the driving motor 110 installed in the driving unit 100 by controller 300 to rotate the chain 130 coupled with the roller 120 in one direction, but preferably, the chain 130 is rotated and operated by operating the driving motor 110 in order that the vibration generator 200 is moved to the back of the seat base 22 in order to inform the driver of a state that the traffic signal lamp approaches the front of the vehicle.

The controller 300 is input with a state that the vibration generator 20 is positioned in a right back of the seat base 22 through the position sensing sensor 34 to stop an operation of the driving motor 100. The power is applied to the vibration motor 230 in a state that the vibration generator 200 is positioned as described above, thereby rotating the rotation cam 220. As shown in the drawings, since the cam body 222 protrudes to be rounded in the shape of the triangle, the rotation cam 220 allows the vibration plate 210 to vibrate the right back of the seat base 22.

If the vibration is generated as described above, the driver who is hearing impairedseated in the seat 20 senses the vibration in the back of the lower side of the thigh so that he knows that he immediately makes a right turn of the vehicle. Accordingly, he drives the handle of the vehicle to the right to make a right turn of the vehicle.

If the vehicle is moved to the U-turn expected region ST14 after making the left turn or the right turn, the vehicle is driven in an U-turn mode ST300.

The U-turn mode ST300 is described with reference to FIG. 1 to FIG. 8.

Figure 8:
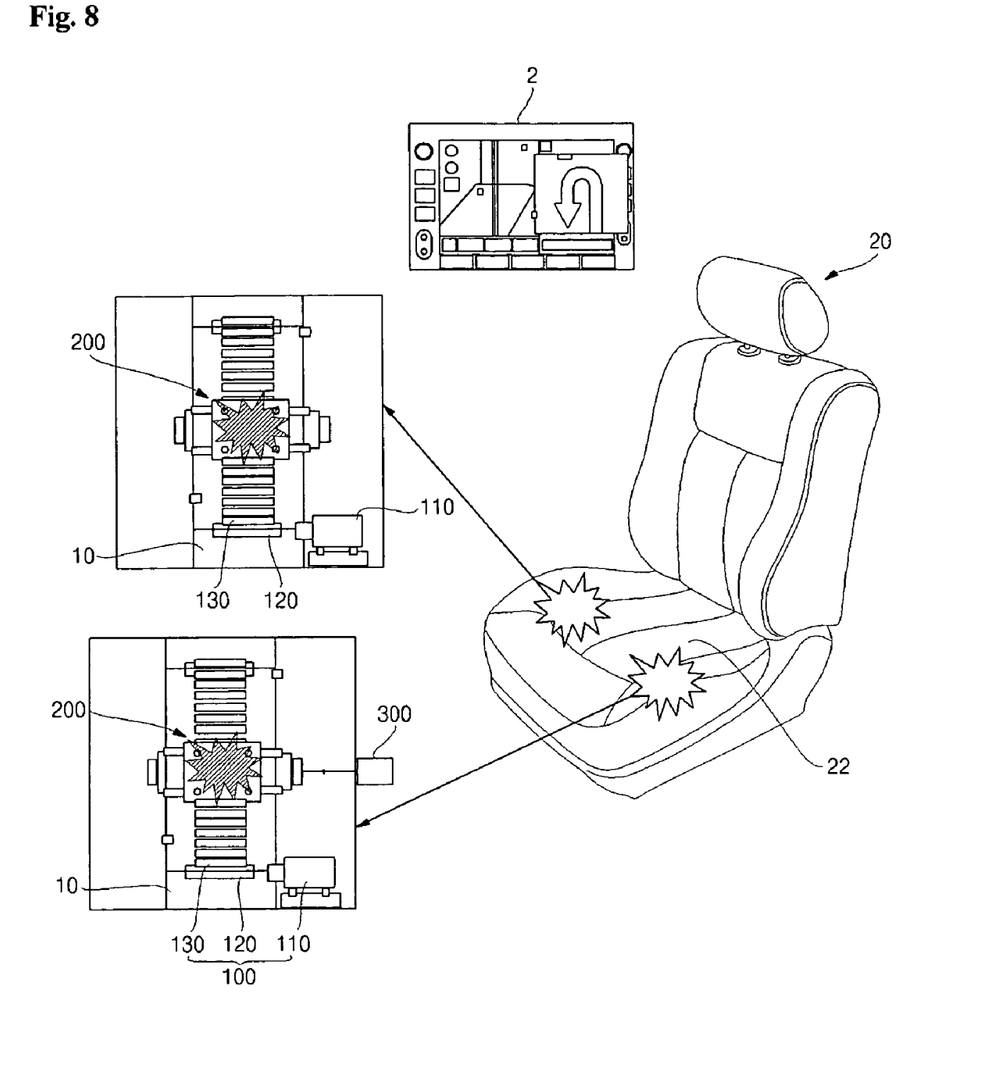
FIG. 8 is a view showing an operating state at the time of U-turn according to the control method of the direction guide vibration system of the vehicle operating with the navigation according to the present invention.

If the vehicle arrives at the U-turn expected region, the driver is informed of the U-turn expected region by simultaneously generating the vibration in both left and right sides of the seat base 22 to generate the vibration in the vibration plate 210.

If the vehicle makes an U-turn to the left ST15, it is driven in the left U-turn mode ST310.

In the left U-turn mode ST310, power is applied to the vibration motor 230 to rotate the rotation cam 220 so that the vibration plate 210 is operated, resulting that the vibration plate 210 generates the vibration in the center left portion of the seat base 22. The driver makes the U-turn of the vehicle to the left direction by sensing the vibration.

If the vehicle makes an U-turn to the right ST17, it is driven in the right U-turn mode ST320.

In the right U-turn mode ST320, power is applied to the vibration motor 230 to rotate the rotation cam 220 so that the vibration plate 210 is operated, resulting that the vibration plate 210 generates the vibration in the center right portion of the seat base 22. The driver makes the U-turn of the vehicle to the right direction by sensing the vibration.

If the vehicle is input with information for a plurality of overspeed cameras installed on moving path through the navigation while being driven at high speed toward the intended destination after making the U-turn of the vehicle, it is driven in an overspeed camera mode ST400 in order to inform the driver of an enforcement area of the overspeed camera before the enforcement area of the overspeed camera.

The overspeed camera sensing mode ST400 is operated in a camera sensing mode ST410 in the position in which the vehicle is distanced above 100 meter from the overspeed camera while entering the region ST18 in which the overspeed camera is installed.

Figure 9:
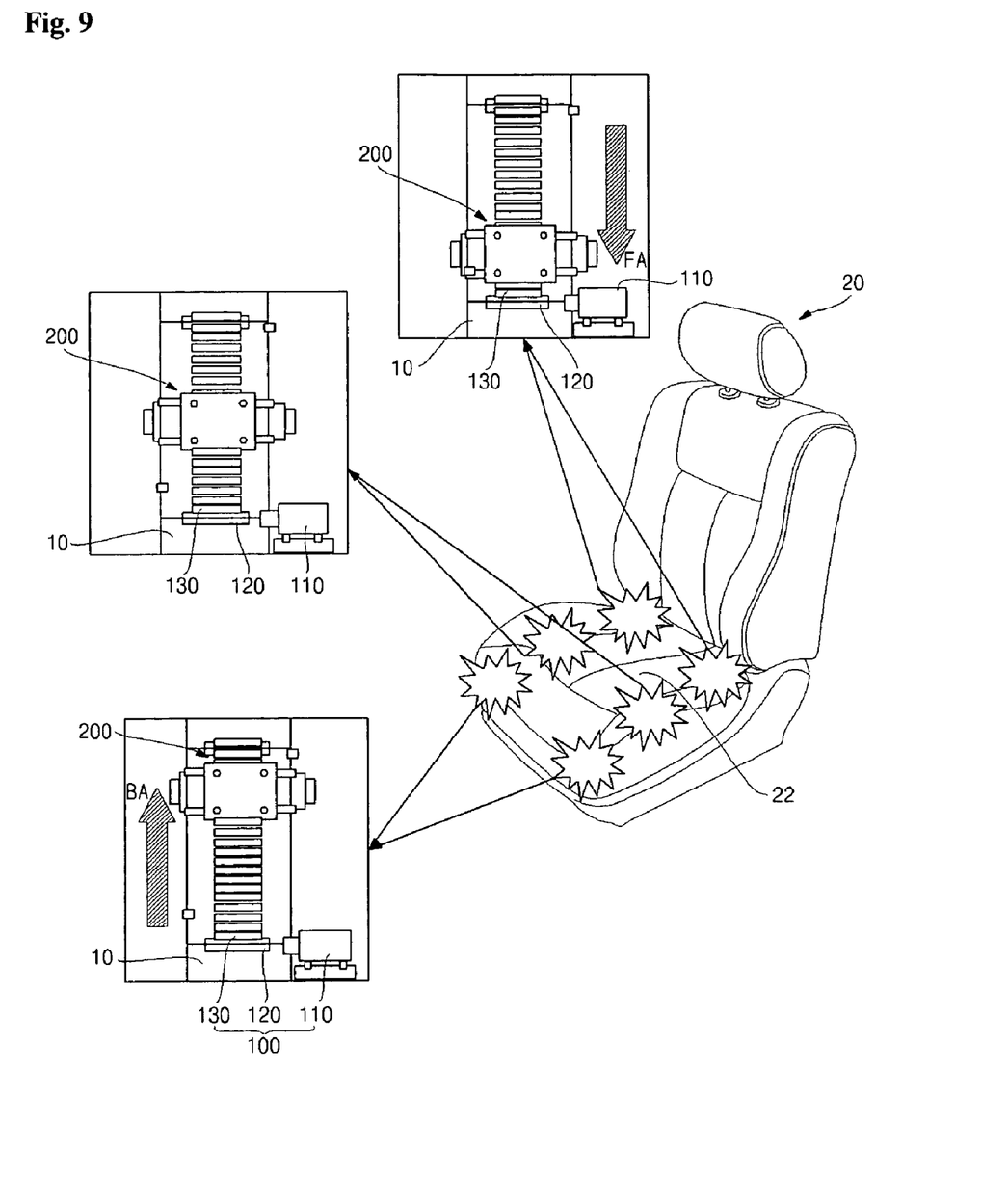
FIG. 9 is a view showing an operating state at the time of finding an overspeed camera according to the control method of the direction guide vibration system of the vehicle operating with the navigation according to the present invention.

In the camera sensing mode ST410, power is applied to the driving motor 110 installed in the driving unit 100 by controller 300 to rotate the chain 130 coupled with the roller 120 in one direction, but preferably, the chain 130 is moved toward the front of the seat base 22 in order to inform the driver of a state that the overspeed camera is distanced and positioned above 100 meter in the front of the vehicle, so that the vibration generator 200 provided in both left and right sides of the seat base 22 is forwardly moved toward the leading end of the seat base 22.

A position of the vibration generator 200 is sensed by a position sensing sensor 32 so that an accurate position of the vibration generator 200 is transferred to the controller 300, and if the vibration generator 200 is positioned in the position memorized on a memory (not shown) of the controller 300, an operation of the driving motor 110 is stopped.

The controller 300 applies the power to the vibration motor 230 in a state that the vibration generator 200 is positioned in the leading end of the seat base 22, thereby rotating the rotation cam 220. Since the cam body 222 protrudes to be rounded in the shape of the triangle, the rotation cam 220 allows the vibration plate 210 to simultaneously vibrate both sides of the seat base 22 twice or three times.

If the vibration is generated as described above, the driver who is hearing impairedseated in the seat 20 senses the vibration in both leading ends of the lower side of the thigh so that he knows that the overspeed camera is installed in the position distanced above 100 meter to the forward area.

If the vehicle is positioned within 100 meter from the overspeed camera ST20 while being continuously driven toward the intended destination, it is driven in a preliminary warning mode ST420.

In the a preliminary warning mode ST420, power is applied to the driving motor 110 installed in the driving unit 100 by controller 300 to rotate the chain 130 coupled with the roller 120 in one direction, but preferably, the chain 130 moved to the front of the seat base 22 in order to inform the driver of a state that the overspeed camera is distanced and positioned within 100 meter from the vehicle is moved to an initial center position so that the vibration generator 200 is positioned in a center of both sides of the seat base 22.

The controller 300 applies the power to the vibration motor 230 in a state that the vibration generator 200 is positioned in the center of both sides of the seat base 22, thereby rotating the rotation cam 220. Since the cam body 222 protrudes to be rounded in the shape of the triangle, the rotation cam 220 allows the vibration plate 210 to simultaneously vibrate the center of both sides of the seat base 22.

If the vibration is generated as described above, the driver who is hearing impairedseated in the seat 20 senses the vibration in the both sides of the lower side of the thigh so that he knows that the overspeed camera is installed in the position distanced within 100 meter to the forward area, thereby reducing a speed of the vehicle to the speed below an overspeed limiting value.

If the slowed-down vehicle most approaches the position in which the camera is installed, it is driven in an approaching warning mode ST430.

In the approaching warning mode ST430, power is applied to the driving motor 110 installed in the driving unit 100 by controller 300 to rotate the chain 130 coupled with the roller 120 in one direction, but preferably, the chain 130 is rotated and operated by operating the driving motor 110 in order that the vibration generator 200 is moved to the back of the seat base 22 in order to inform the driver of a state that the overspeed camera approaches the front of vehicle.

The controller 300 is input with a state that the vibration generator 20 is positioned in a right back of the seat base 22 through the position sensing sensor 34 to stop an operation of the driving motor 100. The power is applied to the vibration motor 230 in a state that the vibration generator 200 is positioned as described above, thereby rotating the rotation cam 220. Since the cam body 222 protrudes to be rounded in the shape of the triangle, the rotation cam 220 allows the vibration plate 210 to simultaneously vibrate the right back of the seat base 22 twice or three times.

If the vibration is generated as described above, the driver who is hearing impairedseated in the seat 20 senses the vibration in both backs of the lower side of the thigh to immediately reduce the speed of the vehicle or maintain the slowed-down state, thereby passing though the overspeed camera.

Although a few embodiments of the present invention have been shown and described, it would be appreciated by those skilled in the art that changes might be made in this embodiment without departing from the principles and spirit of the invention, the scope of which is defined in the claims and their equivalents.

As described above, the direction guide vibration system of a vehicle operating with a navigation and control method thereof according to the present invention enables general persons as well as the hearing impaired to safely drive for the left turn, the right turn or the U-turn and the overspeed camera existing in the intended destination, thereby improving the reliability of the vehicle.

What is claimed is:

1. A direction guide vibration system of a vehicle operating with a navigation system, comprising:
   a driving unit installed along a longitudinal direction of a seat rail provided in the vehicle and comprising a chain having an upper side, which is circulated and operated by a roller connected onto an axis of a driving motor;
   a vibration generator provided in the upper side of the chain to generate a vibration in a driver's seat on which the driver sits at a time of a left turn, a right turn or an U-turn of the vehicle, the vibration being provided together with an image and a voice guide through the navigation system; and
   a controller electrically connected to the driving unit and the vibration generator such that the controller operates the driving unit at the time of the left turn, the right turn and the U-turn of the vehicle to move the vibration generator to a predetermined position along the driving unit and in the predetermined position that the vibration generator is moved, generates the vibration in the vibration generator.

2. The direction guide vibration system of claim 1, wherein the driving motor is a stepping motor.

3. The direction guide vibration system of claim 1, further comprising another driving unit, one driving unit being provided at a lower left side of the driver's seat and the other driving unit being provided at a lower right side of the driver's seat.

4. The direction guide vibration system of claim 1, wherein the vibration generator comprises a vibration plate having a lower side, the vibration plate being provided on the upper side of the chain and a vibration motor installed on the lower side of the vibration plate, such that the vibration motor rotates a cam installed in an end of the axis of the motor to oscillate the vibration plate in up and down directions.

5. direction guide vibration system of claim 4, wherein the seat rail is installed with stoppers such that the stoppers limit movement of the vibration plate.

6. direction guide vibration system of a vehicle operating with the navigation as claimed in claim 4, wherein the cam is formed with a cam body of triangular shape wherein a first portion of the cam body contacts the an outer surface of the vibration plate, the first portion being convex with respect to the outer surface of the vibration plate.

7. direction guide vibration system of claim 1, wherein the driving unit comprises position sensing sensors that are installed on the seat rail such that the sensing sensors sense an upper limit and a lower limit position of the vibration generator.

* * * * *